US007493530B2

(12) United States Patent
Tan

(10) Patent No.: US 7,493,530 B2
(45) Date of Patent: Feb. 17, 2009

(54) METHOD AND APPARATUS FOR DETECTING AN ERROR IN A BIT SEQUENCE

(75) Inventor: Tong Tee Tan, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 939 days.

(21) Appl. No.: 10/606,970

(22) Filed: Jun. 25, 2003

(65) Prior Publication Data

US 2004/0123199 A1   Jun. 24, 2004

(30) Foreign Application Priority Data

Jun. 25, 2002   (SG)   .............................. 200203823-0

(51) Int. Cl.
*G06F 11/00* (2006.01)
*G01R 31/28* (2006.01)
(52) U.S. Cl. ........................................ 714/704; 714/734
(58) Field of Classification Search ................ 714/728, 714/738, 739, 752, 704, 724, 733, 734, 736; 702/107
See application file for complete search history.

(56) References Cited

U.S. PATENT DOCUMENTS

| 4,646,312 | A | * | 2/1987 | Goldsbury et al. | .......... 714/763 |
| 5,043,990 | A | * | 8/1991 | Doi et al. | .................... 714/820 |
| 5,123,020 | A | * | 6/1992 | Yoshimura et al. | .......... 714/820 |
| 5,606,322 | A | * | 2/1997 | Allen et al. | ................... 341/173 |
| 6,002,714 | A | * | 12/1999 | Huscroft | ..................... 375/224 |
| 6,215,876 | B1 | * | 4/2001 | Gilley | ......................... 380/260 |
| 6,307,868 | B1 | * | 10/2001 | Rakib et al. | .................. 370/485 |
| 6,587,804 | B1 | * | 7/2003 | Johnson et al. | ............. 702/107 |
| 2001/0001616 | A1 | * | 5/2001 | Rakib et al. | ................. 375/259 |
| 2003/0005383 | A1 | * | 1/2003 | Pozidis | ....................... 714/752 |
| 2004/0128603 | A1 | * | 7/2004 | Reberga | ..................... 714/738 |
| 2005/0195930 | A1 | * | 9/2005 | Spital et al. | ................. 375/368 |

FOREIGN PATENT DOCUMENTS

GB   2243977 A * 11/1991

OTHER PUBLICATIONS

"Using the general next bit predictor like an evaluation criteria" by Hernandez et al. Oct. 27, 2000 First Open NESSIE (New European Schemes for Signature, Integrity, and Encryption) Workshop Nov. 13-14, 2000.*

* cited by examiner

*Primary Examiner*—Cynthia Britt

(57) ABSTRACT

An error detector for a pseudo-random bit sequence (PRBS). A plurality of bits of a PRBS are received in a predictor circuit. A comparator compares two of the bits to predict a next bit in the sequence. The predicted next bit is compared with the actual next bit that is received to determine if there is an error in the actual next bit, and if so, the actual next bit is corrected accordingly. The erroneous actual next bit is replaced with the corrected actual next bit and is then used to predict a future actual next bit. A trigger circuit delays correction during initial operation until the predictor contains a bit sequence in which no errors have been detected.

18 Claims, 7 Drawing Sheets

METHOD AND APPARATUS FOR DETECTING AN ERROR IN A BIT SEQUENCE

BACKGROUND

In recent years, the performance of communication systems has reached a level where serial data is routinely sent at transmission rates in excess of 2.5 gigabits per second. To achieve these transmission rates, the signal-to-noise ratio of communication equipment is often lowered to a level where errors become significant.

Typically, communication equipment is designed to have a lower bit error rate than the maximum tolerated bit error rate of a communication system in which the communication equipment operates. For example, physical layer specifications for the Asynchronous Transfer Mode (ATM) protocol allow a maximum bit error rate of $10^{-10}$. Accordingly, the bit error rate of communication equipment is often measured both in production and in-situ to determine if the rates conform to system specifications.

Pseudo-Random Bit Sequences (PRBSs) are commonly used in Bit Error Rate (BER) measurements. Devices that perform BER measurements are often referred to as Bit Error Rate Testers (BERTs).

FIG. 1 illustrates the basic features of a communication system incorporating PRBS error measurement. The communication system 100 comprises a transmitter 110 coupled to an input of a communication channel such as a fiber optic cable 120 for transmitting a signal, and a receiver 130 coupled to an output of the communication channel 120 for receiving the signal transmitted over the communication channel 120.

PRBS error measurement is implemented in the communication system 100 using two main components: a PRBS generator 140 and a PRBS error detector 150. The PRBS generator 140 creates a signal containing PRBS data. This signal is provided to the transmitter 110, which transmits the signal over the communication channel 120. The receiver 130 receives the transmitted signal containing the PRBS data created by the PRBS generator 140, and passes the PRBS data to the PRBS error detector 150. The PRBS error detector 150 counts the number of bit errors in the PRBS data over time to determine a bit error rate.

In some systems, the signal from the PRBS generator is a baseband signal, and the transmitter 110 up-converts the baseband signal into a higher frequency transmission signal suitable for transmission over the communication channel 120. The receiver 130 then receives the transmission signal and down-converts the signal back to a baseband signal to recreate the PRBS data.

In other systems, the signal from the PRBS generator is provided at a frequency suitable for transmission over the communication channel 120. In such systems, there is no up-conversion of the signal at the transmitter, and no down-conversation of the signal at the receiver.

Reasons for using a PRBS include:
(1) the PRBS has the same statistical characteristics as a truly random bit sequence; that is, on average there are an equal number of zero value bits as one value bits. When testing communication equipment for bit errors, a truly random sequence is generally a good model for real data; and
(2) the PRBS is an algorithmically deterministic bit sequence, which means that the next bit in the sequence depends only on the state of the system generating the bit sequence; in other words, it is completely predictable. The PRBS error detector 150 uses this characteristic of the PRBS to predict the next bit in the received PRBS. Any discrepancy between the predicted next bit and the actual received next bit is detected as a bit sequence error in the PRBS error detector 150.

PRBS generators and PRBS error detectors are known, for example, from U.S. Pat. No. 6,002,714 issued to Huscroft. As shown in FIG. 2, Huscroft discloses a PRBS generator 140 comprising a seven-stage shift register 141, 142, 143, 144, 145, 146, 147 tapped at the outputs of the sixth and seventh stages 146 and 147 by an exclusive-OR gate 148. The PRBS generator 140 provides a cyclical PRBS of length $2^7-1$ at the output 149 of the seventh stage 147.

As shown in FIG. 3, Huscroft also discloses a PRBS error detector 150 which comprises a complementary seven-stage shift register 151, 152, 153, 154, 155, 156, 157 tapped at the output of the sixth and seventh stages 156 and 157 by a first exclusive-OR gate 158. A received PRBS is applied to the first stage 151 through an input 160. This input, and the output of the gate 158, are applied to a second exclusive-OR gate 159 to provide an error signal at an output 161.

In operation, the PRBS error detector 150 receives at the input 160 the transmitted PRBS from the PRBS generator 140. If seven sequential bits have been output by the PRBS generator 140, then the next bit output from the PRBS generator 140 will be the result of an XOR operation on the first two bits. Assuming that the seven sequential bits from the PRBS generator are then received via the input 160 of the PRBS error detector 150 without error, then the state of the seven-stage shift register in the PRBS error detector 150 will be identical to the state of the seven-stage shift register in the PRBS generator 140 just before the next bit is generated. To predict the next bit generated by the PRBS generator 140, the PRBS error detector 150 uses the gate 158 to perform an XOR operation on the first two received bits of the seven sequential bits from the PRBS generator 140. Because the PRBS error detector 150 taps the shift register at the same relative points as the PRBS generator 140, the XOR gate 158 outputs a predicted next bit, which is a prediction of the next bit that will be received from the PRBS generator 140. The XOR gate 159 performs a comparison between the predicted next bit output by the XOR gate 158, and the received next bit, which is the actual next bit received at the input 160 of the PRBS error detector 150.

If there is no error during the transmission of the actual next bit from the PRBS generator 140 then the predicted next bit will be the same value as the received actual next bit. In this case, the XOR gate 159 will generate a logical "0" output indicating no error. Conversely, if there is an error during the transmission of the actual next bit from the PRBS generator 140 then the received actual next bit will differ from the predicted next bit. In this case, the XOR gate 159 will detect the difference and will generate an output error signal, in this case a logical "1" output.

A drawback of the PRBS error detector 150 is that it assumes the portion of the PRBS stored in the seven-stage shift register contains no errors. If an error exists in any of the bits stored in the shift register then the PRBS error detector 150 will generate an erroneous predicted next bit when the erroneous bit reaches the sixth stage 156 and the seventh stage 157 of the shift register. The erroneous predicted next bit will cause the second XOR gate 159 to generate the error signal at the output of the second XOR gate 159 if the received actual next bit is correct, or to generate a no-error signal if the received actual next bit is erroneous.

If an erroneous bit is received in the PRBS error detector 150, the second XOR gate 159 will output the error signal as described above. Later, when the received erroneous bit propagates through the shift register, it will cause erroneous predictions of the predicted bit when the erroneous bit is tapped from the sixth and seventh stages 156 and 157. Assuming no further erroneous bits are received, the two erroneous predictions of the predicted bit will cause the second XOR gate 159 to generate two further error signals. Thus, for each erroneous bit received in isolation, the PRBS error detector will generate three error signals.

In the PRBS error detector 150, the bit error rate may be calculated by dividing the number of error signals received during an observation period by the length of the observation period, and then dividing that result by a factor of three to account for the three error signals generated for each received erroneous bit. However, this calculation assumes that the erroneous bits are received in isolation, that is, no more than one error bit is received every seven cycles. If erroneous bits are received more frequently than once every seven bits then there will not necessarily be three error signals produced for each received erroneous bit, and in general fewer than three error signals will be generated. For example, two consecutive erroneous bits received in the PRBS error detector 150 will produce only four error signals, two error signals fewer than if the erroneous bits had been received in isolation.

The problem of non-isolated erroneous bits in PRBS error detectors can be ignored as a statistically unlikely event. Or the problem can be solved using statistical analysis to determine the likely number of these non-isolated erroneous bits and then re-factoring the bit error rate based on the analysis. Both of these approaches assume a statistical model for distribution of error bits. Statistical models only provide estimates for the distribution of error bits, and it is therefore inevitable that the bit error rate measured using these approaches will not be completely accurate. For example, if the statistical model assumes a random distribution of error bits then error bits resulting from systematic errors in the communication channel will potentially be ignored. A further drawback with the statistical analysis approach is that it requires additional computation adding to the complexity, reliability and cost of a bit error rate tester.

From the foregoing it will be seen that there remains a need for a simple, fast, easily-realizable bit error detector that gives a correct error indication regardless of the statistical distribution of erroneous bits in a bit sequence such as a PRBS.

SUMMARY OF THE INVENTION

The invention provides a way to detect errors in a bit sequence simply and accurately regardless of the statistical distribution of erroneous bits in a bit sequence.

Briefly and in general terms, an error detector according to an embodiment of the invention has a predictor circuit that uses a plurality of bits of a bit sequence to predict a next bit in the sequence, a comparator circuit that compares an actual next bit in the sequence with the predicted next bit to determine whether there is any error in the actual next bit, and a correction circuit that corrects any error in the actual next bit. In some aspects of the invention, the bit sequence comprises a pseudo-random bit sequence. In some aspects, the correction circuit replaces the actual next bit with the corrected actual next bit in the bit sequence.

In some embodiments a trigger circuit activates the correction circuit when the predictor circuit contains a bit sequence in which no errors have been detected.

The invention also provides a method for detecting errors in a bit sequence by predicting a next bit of a bit sequence according to previous bits of the sequence, comparing the predicted next bit with an actual next bit, and if they differ, providing an error signal and correcting the actual next bit. In one aspect the actual next bit is replaced in the bit sequence with a corrected actual next bit.

In one aspect of the invention, correcting the actual next bit is suppressed until no error has been detected in a plurality of bits in the sequence. One way to do this is to determine whether any bit errors occur during a predefined interval.

Other aspects and advantages of the invention will become apparent from the following detailed description, taken in conjunction with the accompanying drawings, illustrating by way of example the principles of the invention.

BRIEF DESCRIPTION OF DRAWINGS

Embodiments of the invention will now be described, by way of example, with reference to the accompanying drawings, in which.

DETAILED DESCRIPTION

Figure 1:
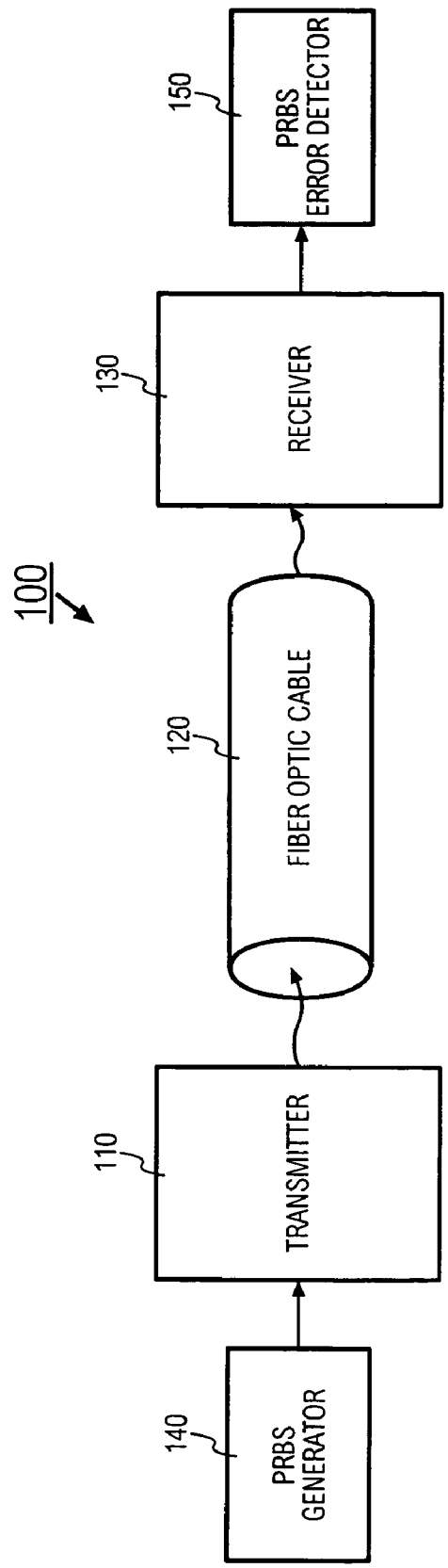
FIG. 1 is a schematic diagram illustrating the basic features of a communication system incorporating PRBS error measurement according to the prior art.
Figure 2:
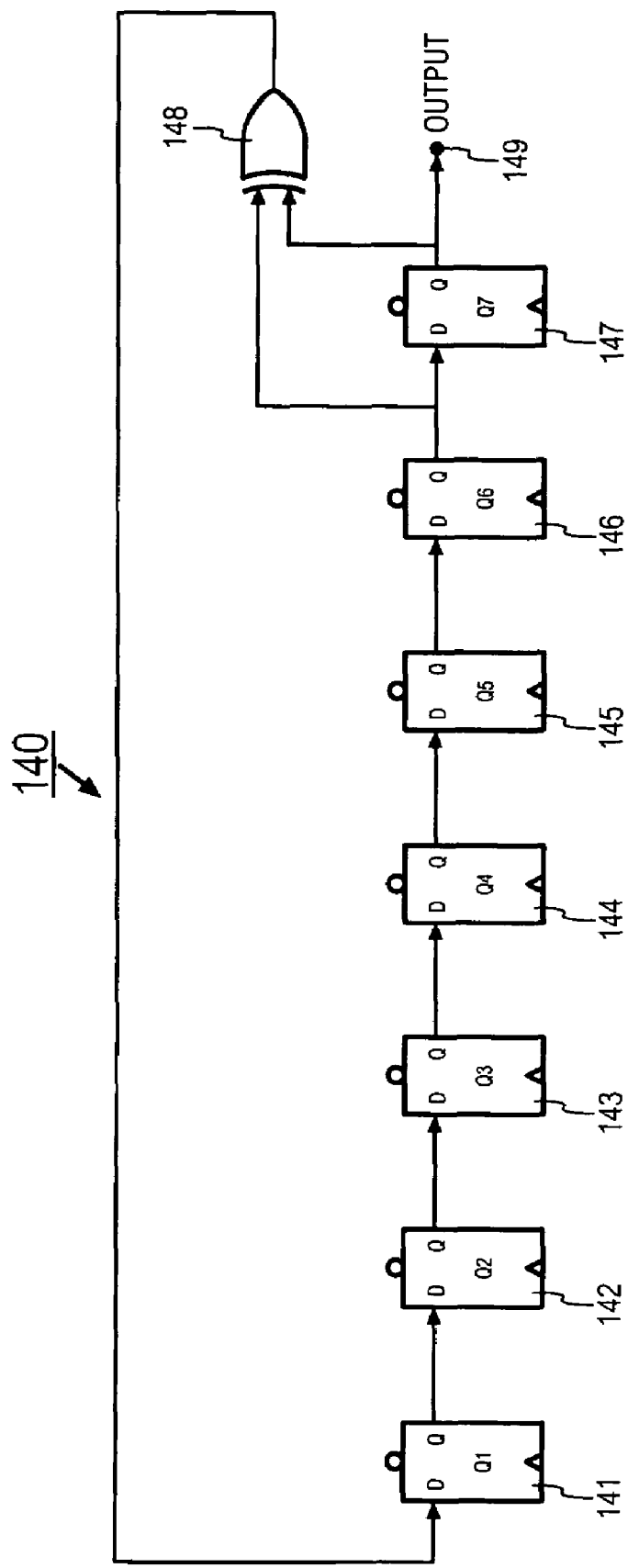
FIG. 2 is a schematic diagram of a PRBS generator according to the prior art.
Figure 3:
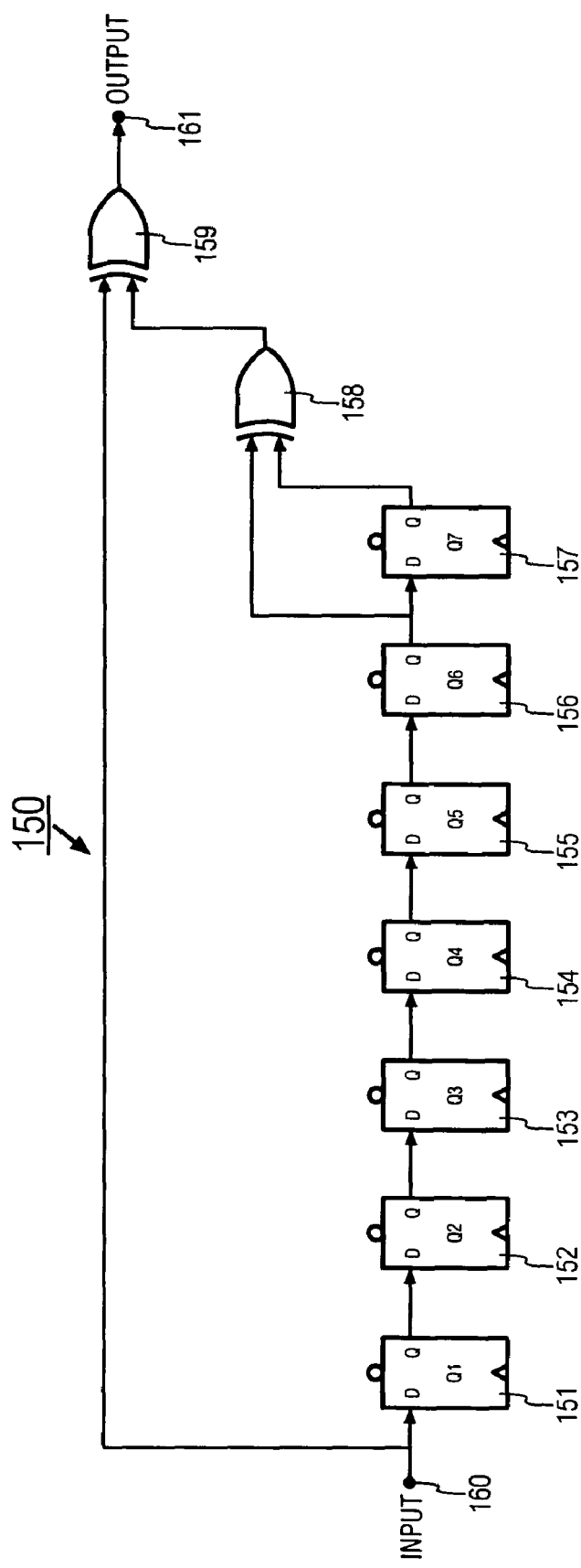
FIG. 3 is a schematic diagram of a PRBS error detector according to the prior art.

As shown in the drawings for purposes of illustration, the invention is embodied in a bit error detector that gives a correct error indication regardless of the statistical distribution of errors in a bit sequence such as a pseudo-random bit sequence ("PRBS"). There has been a need for an easily-realizable, accurate bit error detector for testing high-speed communication systems and other applications, but prior approaches have suffered from various drawbacks.

Figure 4:
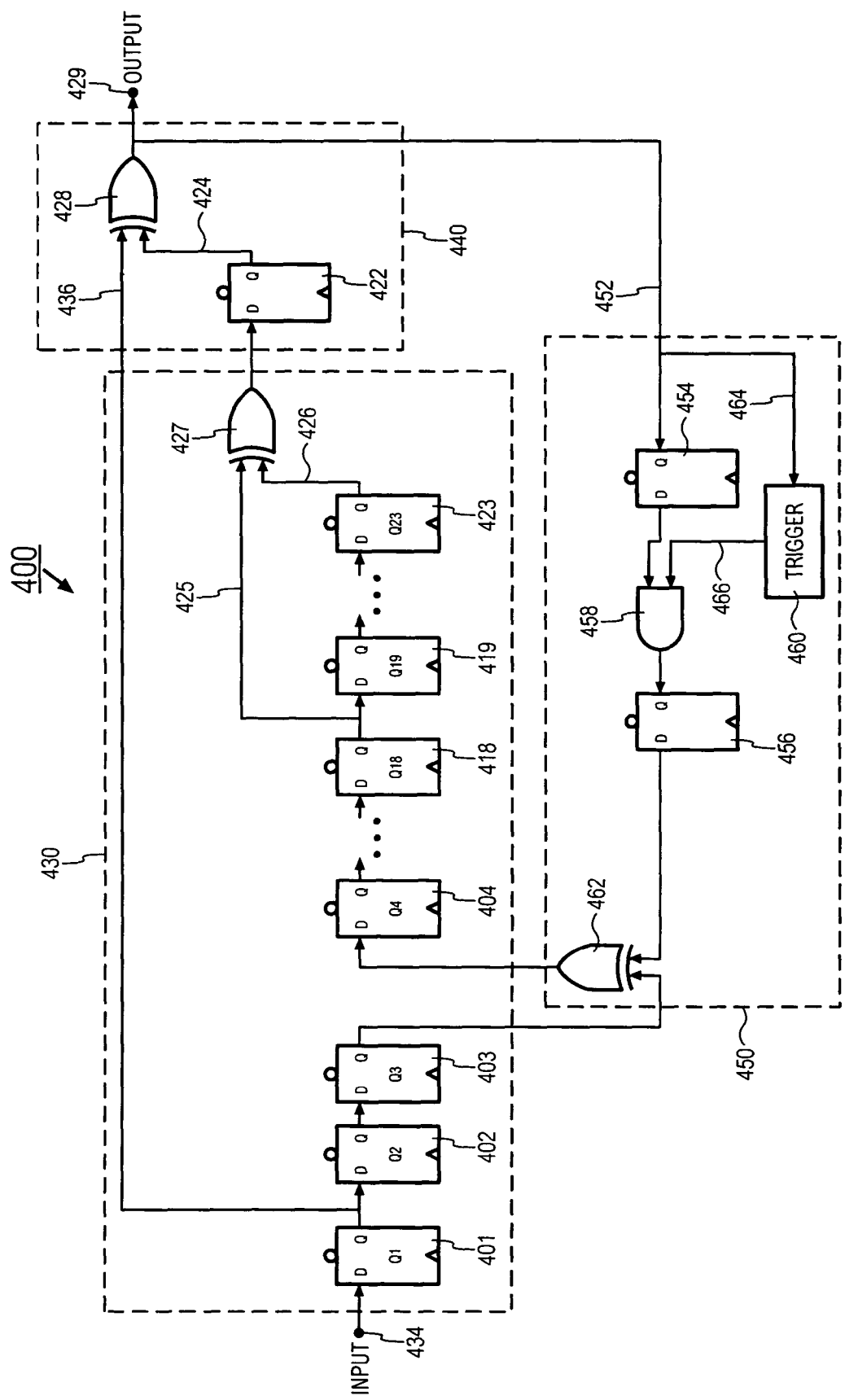
FIG. 4 is a schematic diagram of a PRBS error detector according to an embodiment of the invention.

Referring to FIG. 4, there is shown a bit error detector 400 generally embodying the invention. Although the bit error detector 400 is adapted for PRBSs, the principles of the invention are also applicable to bit error detectors adapted for other kinds of bit sequences.

The bit error detector 400 comprises a predictor circuit 430 that uses a plurality of bits of a bit sequence to predict a next bit in the sequence, a comparator circuit 440 that compares an actual next bit in the sequence with the predicted next bit to determine whether there is any error in the actual next bit, and a correction circuit 450 that corrects any error in the actual next bit to provide a corrected actual next bit.

Predictor Circuit

The predictor circuit 430 includes an input 434 for receiving the PRBS, a linear series shift register, and a tapping circuit.

The linear series shift register comprises twenty-three stages 401, 402, 403, 404, 418, 419, and 423. Stages five to seventeen and twenty to twenty-two are represented by a series of three dots for the sake of clarity. Each stage has an input and an output, with the output of the first stage 401 being coupled to the input of the second stage 402, the output of the second stage 402 being coupled to the input of the third stage 403, and so on until the input of the twenty-third stage 423. The input 434 is coupled to the input of the first stage 401, and receives an actual next bit of the PRBS.

The tapping circuit comprises two tapping lines 425 and 426 and a first XOR gate 427. The first tapping line 425 taps the output of the eighteenth stage 418, while the second tapping line 426 taps the output of the twenty-third stage 423. The two tapping lines 425, 426 are coupled to the two inputs of a first XOR gate 427.

The function of the predictor circuit 430 is to receive a portion of a PRBS and predict a next bit, which will hereinafter be referred to as the predicted next bit, of the PRBS based on the received portion. The predictor circuit 430 determines the predicted next bit, and provides the predicted next bit at the output of the first XOR gate 427. The PRBS signal is generated by a corresponding PRBS generator (not shown) having an equivalent number of stages (twenty-three in the exemplary circuit as illustrated) and equivalent tapping points (stages eighteen and twenty-three). The PRBS signal generated by such a PRBS generator has a pattern count of $2^{23}-1$.

Comparator

The function of the comparator circuit 440 is to receive the actual next bit of the PRBS, compare the actual next bit with the predicted next bit to detect if there is an error in the actual next bit, and output a signal indicative of an error in the actual next bit. To achieve this function, the comparator circuit 440 of the present embodiment comprises a re-timing stage 422, two input lines 424 and 436, and a second XOR gate 428.

The predicted next bit is provided from the first XOR gate 427 to a first input of the second XOR gate 428 via the re-timing stage 422 and the input line 424. The re-timing stage 422 is included to prevent setup time violations. Such violations can occur when one logic gate is connected directly to another logic gate. To achieve higher bit rates, the present design provides for only one level of combination logic between stages. Instead of feeding the output of the first XOR gate 427 directly to the input of the second XOR gate 428, the re-timing stage 422 is provided to ensure accurate data and no setup time violation. To compensate for the one cycle delay in the comparator 440, the input line 436 carries the received actual next bit from the output of the first stage 401 to a second input of the second XOR gate 428.

The second XOR gate 428 performs an XOR operation on the received actual next bit and the predicted next bit such that the second XOR gate 428 outputs a logical "1" signal only when there is a difference between the logic values of the received actual next bit and the predicted next bit. If the logic values of the received actual next bit and the predicted next bit match, then the second XOR gate 428 outputs a logical "0" signal. A difference between the logic value of the received actual next bit and the logic value of the predicted next bit indicates that there is an error in the received actual next bit. Consequently, a logical "1" signal output by the second XOR gate 428 is indicative of an error in the received next bit.

In operation, the bit error detector 400 receives a portion of the PRBS into the 23-stage shift register and taps the register to generate a predicted next bit at the output of the XOR gate 427. The second XOR gate 428 receives an actual next bit of the PRBS and compares this received actual next bit with the predicted next bit. The output of the second XOR gate 428 then indicates whether there is a difference between the received actual next bit and the predicted next bit, and thus whether there is an error in the received actual next bit. The bit error detector 400 operates on subsequently received bits of the PRBS in the same manner.

Correction Circuit

To negate the adverse effect of received error bits entering the linear series shift register of the predictor 430, the bit error detector 400 includes a correction circuit 450 that corrects the received error bits, thus preventing the error bits from propagating through the linear series shift register.

The correction circuit 450 operates in response to the output signal of the second XOR gate 428. When the output signal indicates an error in the received actual next bit then the correction circuit 450 corrects the error by changing the value of the received actual next bit as it propagates through the linear series shift register.

According to a first embodiment shown in FIG. 4, the correction circuit 450 comprises a feedback line 452 coupled to the output of the second XOR gate 428, two re-timing stages 454 and 456, an AND gate 458, a trigger circuit 460, and a third XOR gate 462.

The feedback line 452 supplies the output signal as a correction signal from the second XOR gate 428 via the first re-timing stage 454 to a first input of the AND gate 458. Meanwhile, the trigger circuit 460 supplies a trigger signal to a second input of the AND gate 458 on a line 466. The output of the AND gate 458 is supplied via the second re-timing stage 456 to a first input of the third XOR gate 462.

The AND gate 458 provides a switch for switching ON and OFF the correction circuit 450. The switching operation of the AND gate 458 is controlled by the trigger signal from the trigger circuit 460. When the trigger circuit 460 supplies a logical "0" signal to the AND gate 458, the output of the AND gate 458 is always zero regardless of the value of the correction signal supplied by the feedback line 452, hence the correction circuit 450 is switched OFF. However, when the trigger circuit 460 supplies a logical "1" signal to the AND gate 458, the AND gate 458 outputs a signal corresponding to the correction signal from the feedback line 452. Consequently, the correction signal supplied by the feedback line 452 to the first input is relayed by the AND gate 458, thus switching ON the correction circuit 450.

The third XOR gate 462 is positioned between the third and fourth stages 403 and 404 of the predictor 430. Specifically, the output of the third stage 403 couples to the second input of the third XOR gate 462, and the output of the third XOR gate 462 couples to the input of the fourth stage 404. The position of the third XOR gate 462 enables the values in the linear series shift register to be altered by the correction circuit to correct erroneous bits which enter the linear series shift register from the input 434.

When the first input to the third XOR gate 462 is a logical "0", the value of the output of the third XOR gate 462 is equal to the value of the second input to the third XOR gate 462. Hence, the output of the third stage 403 is relayed to the input of the fourth stage 404.

However, when the first input to the third XOR gate 462 is a logical "1", the value of the output of the third XOR gate 462 is equal to the inverted value of the second input to the third XOR gate 462. Hence, the value of the received bit stored in the third stage 403 is inverted as it propagates from the output of the third stage 403 to the input of the fourth stage 404. It is this inversion of an erroneous bit that constitutes correction by the correction circuit 450.

The purpose of the re-timing stages 454 and 456 is to ensure that the correction signal is accurate and free from setup time violations as it passes through the correction circuit 450. The operation of the correction circuit 450 will now be described assuming that the trigger circuit 460 has switched ON the correction circuit 450.

When no erroneous bits are received by the bit error detector 400, the second XOR gate 428 outputs a constant logical "0" output signal, indicating that there are no erroneous bits in the received PRBS. The constant logical "0" output signal is tapped by the feedback line 452 to provide a constant logical "0" correction signal to the correction circuit 450. The correction circuit 450 supplies the constant logical "0" correction signal to the third XOR gate 462, resulting in the output of the third stage 403 being relayed to the input of the fourth stage 404. Therefore, when there are no erroneous bits received by the bit error detector 400, the correction circuit 450 does not perform any corrective action on the received PRBS.

When the bit error detector 400 receives an erroneous bit in a PRBS, that bit is stored for one clock cycle in the first stage 401. At the end of the first clock cycle, the erroneous bit is output to the second stage 402. At the same time, the erroneous bit is tapped by the comparator 440, which detects it, and generates a logical "1" output signal at the output of the second XOR gate 428. The logical "1" output signal is tapped by the feedback line 452 to provide a logical "1" correction signal to the first re-timing stage 454 of the correction circuit 450.

At the end of the second clock cycle, the erroneous bit is output to the third stage 403, and simultaneously, the logical "1" correction signal is output from the first re-timing stage 454 via the AND gate 458 to the second re-timing stage 456.

At the end of the third clock cycle, the erroneous bit is output from the third stage 403 to the second input of the third XOR gate 462, and simultaneously, the logical "1" correction signal is output from the second re-timing stage 456 to the first input of the third XOR gate 462. The logical "1" correction signal causes the third XOR gate 462 to correct the erroneous bit by inverting it, and output a corrected bit to the fourth stage 404. Eventually, the corrected bit propagates to the tapped eighteenth and twenty-third stages 418 and 423 to provide a correct prediction of a future received bit.

Trigger Circuit

In some embodiments the correction circuit 450 is switched ON by the trigger circuit 460 only when the bit error detector 400 contains a bit sequence that has no erroneous bits. This can be determined through observation of the output signal from the second XOR gate 428, and the trigger circuit 460 can be activated manually once such a determination has been made. It is also possible for the trigger circuit 460 to be activated by a simple timer.

In some embodiments the trigger circuit 460 is activated by monitoring the output signal from the second XOR gate 428, as indicated by a feedback line 464.

Figure 5:
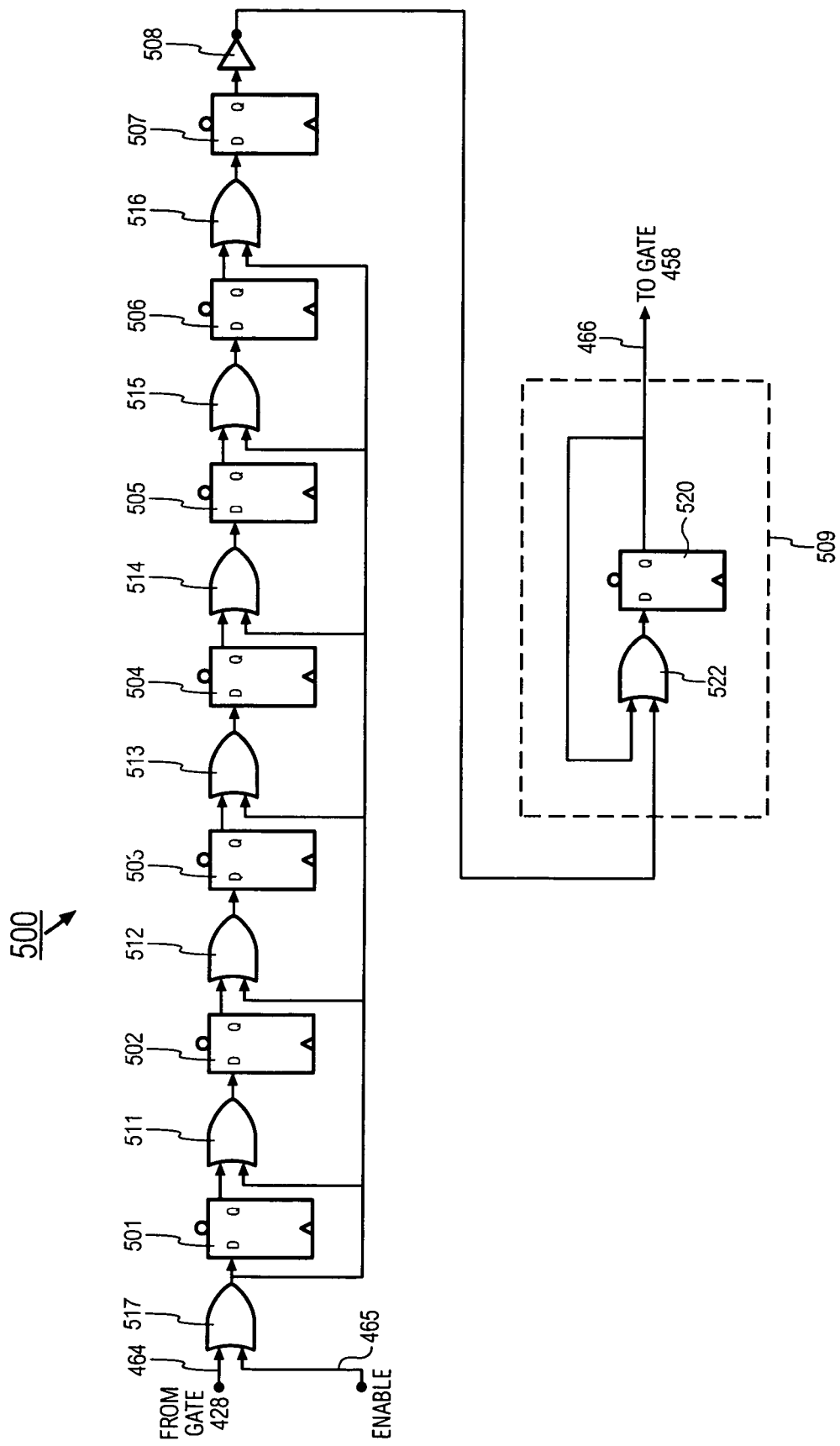
FIG. 5 is a schematic diagram of a trigger circuit for use in the PRBS error detector shown in FIG. 4.

FIG. 5 illustrates a trigger circuit 500 that may be used with the bit error detector 400.

The trigger circuit 500 makes sure no erroneous bits reside in the linear series shift register before the correction circuit 450 is switched ON. The trigger circuit 500 operates on the principle of counting a suitable number of consecutive logical "0"s output by the second XOR gate 428 prior to providing a trigger signal.

The trigger circuit 500 includes a linear shift register having a plurality of stages 501 through 507. The first stage 501 is coupled to the second stage 502 through an OR gate 511, the second stage 502 is coupled to the third stage 503 through an OR gate 512, and so on through the sixth stage 506 which is coupled to the seventh stage 507 through an OR gate 516. An OR gate 517 has a signal input that receives the output signal from the XOR gate 428 via the line 464 and an enable input that receives an enable signal via a line 465 from an external source (not shown).

Initially, a logical "1" is maintained at the enable input of the OR gate 517 to inhibit operation of the trigger circuit 500. This signal propagates through all stages of the linear shift register in a single clock cycle through the OR gates 511 through 516 and passes from the output of the last stage 507 through an invert gate 508 to a latch 509. When it is desired to start the trigger circuit 500, the enable input of the OR gate 517 is set to a logical "0". This enables the trigger circuit 500 and the output signal of the second XOR gate 428 is relayed through the OR gate 517, and passes into the first stage 501 of the linear shift register. If there are no errors then a logical "0" signal representing no errors will propagate through the subsequent stages 502-506 of the linear shift register until it reaches the last stage 507. The logical "0" output of the last stage 507 is inverted to a logical "1" by the invert gate 508, and this logical "1" then passes to the latch 509.

The latch 509, which is shown as a D flip-flop 520 interconnected with an OR gate 522, ignores a logical "0" input. But when it receives a logical "1" input, it holds the logical "1" signal regardless of whether a logical "0" signal is subsequently provided at the output of the invert gate 508. A logical "1" output signal from the latch 509 provides the trigger signal to the AND gate 458 on the line 466 to enable the correction circuit 450 to commence normal operation.

If a logical "1" signal, representing an erroneous bit in the PRBS, enters the signal input of the OR gate 517 before all the stages of the shift register fill up with logical "0"s, the stages 501 through 507 will all reset to logical "1" through the OR gates 511 through 516 in the next clock cycle. This indicates that the bit error detector circuit 400 has not yet received a bit sequence that is free from erroneous bits. The trigger circuit 500 must then recount the number of consecutive logical "0"s again by propagating a logical "0" into the linear shift register. The number of consecutive logical "0"s counted by the trigger circuit 500 depends on the number of shift register stages. Accordingly, a desired count can be achieved by a corresponding number of shift register stages. In the trigger circuit 500, there are seven shift register stages making the count suitable for a predictor with seven stages, that is, for a $2^7-1$ PRBS detector circuit. A trigger circuit suitable for a predictor having 23 shift register stages, such as the predictor of 430 would have at least 23 stages.

Figure 6:
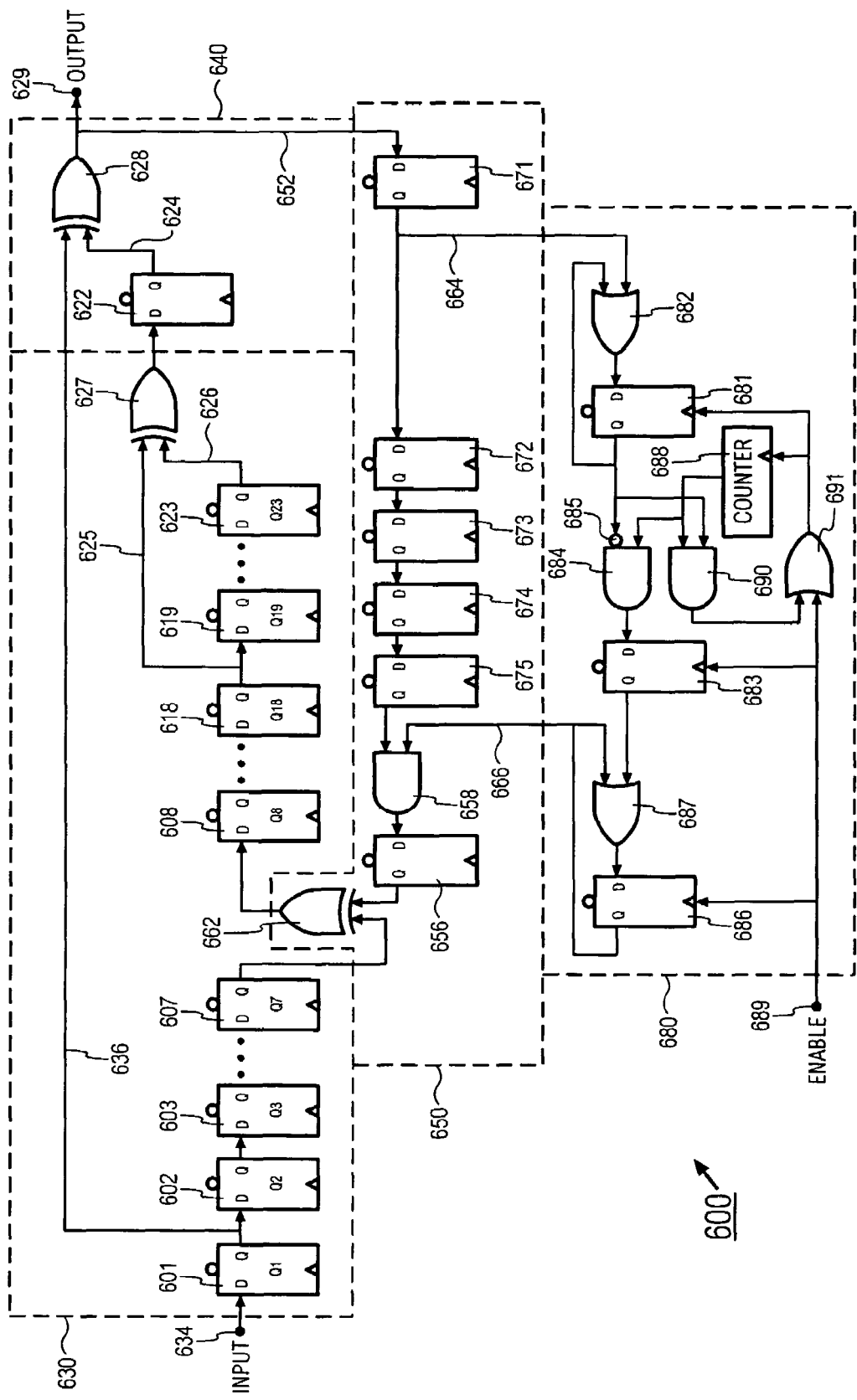
FIG. 6 is a schematic diagram of a PRBS error detector generally similar to that shown in FIG. 4 and including a trigger circuit.

FIG. 6 illustrates an alternate embodiment of a PRBS error detector 600 according to the invention. This PRBS error detector 600 has several similarities to the error detector 400 illustrated in FIG. 4, and described above, and incidental references to FIG. 4 will be made in the following description. For convenience, elements in FIG. 6 that are similar to corresponding elements in FIG. 4 have similar reference numerals incremented by 200. Elements that are similar will not be discussed except as necessary to describe the differences between the circuits of FIG. 6 and FIG. 4. The PRBS error detector 600 includes a predictor circuit 630 that is similar to the predictor circuit 430, a comparator circuit 640 that is similar to the comparator circuit 440, and a correction circuit 650 that is similar to the correction circuit 450. The PRBS error detector 600 has a trigger circuit 680 that will be explained in detail presently.

The correction circuit 650 contains a re-timing stage 656, an AND gate 658 and an XOR gate 662 that are similar to the re-timing stage 456, AND gate 458 and XOR gate 462, respectively. However the XOR gate 662 is connected between the seventh shift register stage 607 of the predictor 630 and the eighth shift register stage 608, rather than between the third and fourth shift register stages 403 and 404 of the predictor 430. The correction circuit 650 contains five re-timing stages 671 through 675 rather than the single re-timing stage 454 as in the correction circuit 450.

The functioning of the correction circuit 650 is analogous to the functioning of the correction circuit 450. If a bit i.e. an actual next bit received at the input 634 is erroneous, an error signal will be provided as a logical "1" at the output 629 of the XOR gate 628 at the moment when the erroneous bit appears at the output of the first stage 601 of the linear shift register. This error signal propagates through the five re-timing stages 671 through 675 and arrives at the XOR gate 662 at the moment when the erroneous bit has propagated through the linear shift register stages 602 through 607.

The trigger circuit 680 includes a flip-flop stage 681 and an OR gate 682 connected as a latch, a flip-flop stage 683 and an AND gate 684 with an inverting input 685 connected as a rising-edge detector, a flip-flop stage 686 and an OR gate 687 connected as another latch, and a counter 688. The output from the XOR gate 628 is applied to an input of the OR gate 682 through a conductor 664, delayed one clock cycle by the stage 671. The output of the stage 681 is applied to the inverting input 685 of the AND gate 684. The output of the stage 683 is applied to an input of the OR gate 687. The output of the stage 686 is applied to the AND gate 658 through a conductor 666. An output of the counter 688 is applied to a non-inverting input of the AND gate 684 and a non-inverting input of the AND gate 690

The functioning of the trigger circuit 680 will now be explained. The trigger circuit 680 switches on the correction circuit 650 at a time when the predictor circuit 630 contains a bit sequence in which no errors have been detected. Initially a logical "1" signal is applied to an enable input 689 and thence to the reset inputs of the stages 683 and 686 and, through an OR gate 691, to the stage 681 and the counter 688, holding them all in a reset state. When it is desired to switch on the correction circuit 650, a logical "0" is applied to the enable input 689, thereby enabling the stages 681, 683 and 686 and the counter 688.

The counter 688, once enabled, counts for a time period sufficient to allow a bit to propagate all the way through the shift register stages 601 to 623 of the predictor circuit 630. In the embodiment illustrated, this would be a time equal to or greater than 7.36 ns (320 ps times 23), where 320 ps is the period of the pattern running at 3.125 GHz and 23 is the length of the pattern. A low speed counter running at, for example, 200 MHz may be used, in which event it would be sufficient for the counter 688 to count to two, establishing a time period of 10 ns.

If the counter 688 completes the count without any error signal having been received from the XOR gate 628, the counter 688 outputs a logical "1" signal. Meanwhile, the stage 681 outputs a logical "0" signal indicating no error. This combination of signals enables the AND gate 684 to provide a logical "1" through stage 683, setting the stage 686 to provide a logical "1" output. The output from the stage 686 is applied to the AND gate 658, and thereafter any error signals will be processed through the correction circuit 650 as previously described. Once the output of the stage 686 becomes a logical "1", it is held there by virtue of the locking action of the OR gate 687 in combination with the stage 686, and any subsequent signals from the stage 683 are ignored.

But if an error signal is received from the XOR gate 628 before the counter 686 completes the count, the stage 681 will provide a logical "1" to the inverting input 685 of the AND gate 684, blocking any signal that subsequently arrives from the counter 688 and keeping the output of the stage 683 at a logical "0" and thereby preventing a logical "1" signal from arriving at the AND gate 658. Meanwhile, the logical "1" outputs of the stage 681 and the counter 688 are applied to the AND gate 690, which in turn applies a logical "1" to the OR gate 691, causing the output of the OR gate 691 to go to a logical "1". This output is applied to the reset inputs of the stage 681 and the counter 688, resetting the circuit so it can start counting again.

Advantages of the trigger circuit 600 of FIG. 6 over the trigger circuit 500 include (1) no gate has a fanout greater than two, thereby reducing the loading of the circuit, which in turn improves performance, especially for high speed applications; (2) the number of required shift register stages is independent of the pattern length of the bit sequence used by the predictor; and (3) the counter 688 and the associated gates 690 and 691 can be synthesized as a low-speed state machine by means of a standard library cell.

Figure 7:
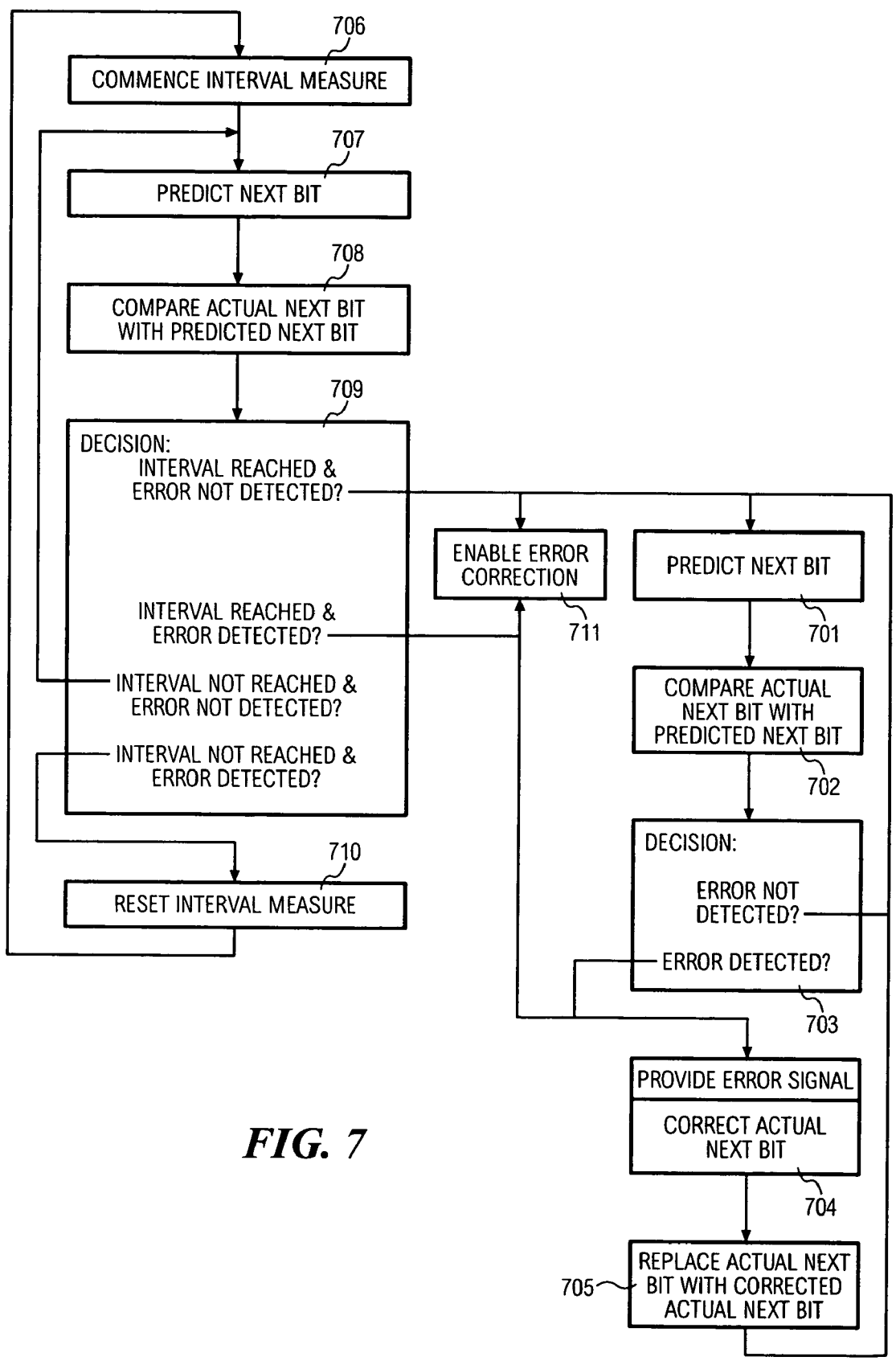
FIG. 7 is a flow chart of a method of detecting errors in a PRBS according to the invention.

As shown in flow-chart form in FIG. 7, a method for detecting errors in a bit sequence includes predicting 701 a next bit of a bit sequence such as a PRBS according to a plurality of previous bits of the sequence, comparing 702 the predicted next bit with an actual next bit, deciding 703 whether there is an error which indicates a difference between the predicted and actual next bits, and providing 704 an error signal and correcting the actual next bit. Correcting the actual next bit may include replacing 705 the actual next bit with the corrected actual next bit in the bit sequence.

If the bit sequence comprises a PRBS with a pattern count of $2^N-1$, N bits may be received. In one aspect of the invention a PRBS generator such as the shift register stages 401 to 423 of FIG. 4 may receive these bits.

In some embodiments the error detection does not commence until no error has been detected in a plurality of bits in the sequence. This may be done by observing whether any errors are detected during a predefined interval. For example, in one aspect of the invention, measurement of the interval is commenced 706, the next bit is predicted 707, and the predicted and actual next bits are compared 708. If an error is detected 709 before the interval has been reached, the interval measure is reset 710, measurement of the interval begins again, and prediction of the next bit resumes. When no errors have been detected until the interval has been reached, correction of the actual next bit is enabled 711.

In the foregoing manner, any correction of the actual next bit is suppressed if an error is detected during the interval. The interval may be established by counting bits or clock cycles, or by passage of time, or some other convenient technique.

Although certain embodiments have been described and illustrated, the invention is not to be limited to these specific embodiments. Various modifications may be made within the scope of the invention. For example, there may be more or less than 23 shift registers in the predictor. The various shift register stages are depicted as D flip-flops in the illustrations, but other circuit devices would also be satisfactory. The principles of the invention may have applications other than in testing communication systems. The invention is limited only by the claims.

I claim:

1. A bit error detection circuit comprising:

a predictor circuit that uses a plurality of bits of a bit sequence to predict a next bit in the sequence;

a comparator circuit that compares an actual next bit in the sequence with the predicted next bit to determine whether there is any error in the actual next bit; and a correction circuit that corrects any error in the actual next bit to provide a corrected actual next bit; and a trigger circuit that, in response to an error in the actual next bit indicating presence of an erroneous bit in the predictor circuit, disables the correction circuit until the predictor circuit no longer contains erroneous bits.

2. A bit error detection circuit as in claim 1 wherein the correction circuit comprises a circuit element that replaces the actual next bit with the corrected actual next bit in the plurality of bits.

3. A bit error detection circuit as in claim 1 wherein the bit sequence comprises a pseudo-random bit sequence and the predictor circuit predicts the next bit by comparing two of the bits of the sequence.

4. A bit error detection circuit as in claim 1 wherein the trigger circuit determines that the predictor circuit no longer contains erroneous bits by determining when no erroneous bits have been observed during a predefined interval.

5. A bit error detection circuit as in claim 4 wherein the predefined interval is defined in terms of a quantity of bits.

6. A bit error detection circuit as in claim 4 wherein the predefined interval is defined in terms of an interval of time.

7. A bit error detection circuit comprising:
a shift register that receives N bits of a pseudo-random bit sequence (PRBS);
a first logic element that receives output signals from two stages of the shift register and provides a signal indicative of a predicted (N+1)-th bit;
a second logic element that receives the signal indicative of the predicted (N+1)-th bit and a signal indicative of an actual (N+1)-th bit and provides an output signal indicative of any error in the actual (N+1)-th bit; and
a third logic element that receives the output signal and corrects the actual (N+1)-th bit according to the output signal as the (N+1)-th bit propagates through the shift register; and
a trigger circuit that, in response to an error in the actual (N+1)-th bit indicating presence of an erroneous bit in the shift register, disables the third logic element from correcting the actual (N+1)-th bit until the shift register no longer contains erroneous bits.

8. A bit error detection circuit as in claim 7 wherein the third logic element receives the actual (N+1)-th bit from one of the shift register stages, corrects said bit according to the output signal, and inserts said bit as corrected into another one of the shift register stages in place of the actual (N+1)-th bit.

9. A bit error detection circuit as in claim 7 wherein the trigger circuit comprises a logic circuit that receives the output signal and provides an enabling signal if no error is indicated while a predefined number of bits propagates through the shift register.

10. A bit error detection circuit as in claim 7 wherein the trigger circuit comprises a timer that provides an enabling signal if no error is indicated during a predefined time interval.

11. A method of detecting errors in a bit sequence comprising:
predicting a next bit of a bit sequence according to a plurality of previous bits of the sequence;
comparing the predicted bit with an actual next bit; and
if the comparison indicates a difference between the predicted and actual next bits, providing an error signal and correcting the actual next bit; and
in response to the error signal, disabling correcting the actual next bit until no additional error signal has been provided during a predefined interval.

12. A method as in claim 11 wherein correcting the actual next bit comprises replacing the actual next bit with the corrected actual next bit in the bit sequence.

13. A method as in claim 11 wherein the bit sequence comprises a pseudo-random bit sequence.

14. A method as in claim 11 wherein disabling correcting the actual next bit comprises measuring a period of time to determine when the predefined interval has elapsed.

15. A method as in claim 11 wherein disabling correcting the actual next bit comprises counting a predefined number of bits as they propagate through a circuit element to determine when the predefined interval has elapsed.

16. A bit error detector comprising:
an actual next bit input that receives a plurality of bits of a bit sequence;
a predictor coupled to the input and having a predicted next bit output;
a comparator coupled to the predicted next bit output and to the actual next bit input, the comparator having an error signal output; and
a corrector coupled to the error signal output and having a corrected actual next bit output; and
means for disabling the corrector, in response to an error signal indicating presence of an erroneous bit in the predictor, from correcting the actual next bit until the predictor no longer contains erroneous bits.

17. A bit error detector as in claim 16 wherein:
the predictor comprises a predictor circuit for receiving the plurality of bits, for determining a predicted next bit from at least some of the plurality of bits, and for providing the predicted next bit at the predicted next bit output;
the comparator comprises a comparator circuit for receiving the predicted next bit and the actual next bit, for comparing the predicted next bit and the actual next bit, and for providing an error signal at the error signal output when a difference is detected between the predicted next bit and the actual next bit; and
the corrector comprises a correction circuit for receiving the error signal, producing a corrected actual next bit, and providing a corrected actual next bit, and providing the corrected actual next bit at the corrected actual next output.

18. A high-speed communication system, comprising:
a pseudo-random bit sequence generator for creating a pseudo-random bit sequence;
a transmitter in signal communication with the pseudo-random bit sequence generator, wherein an input to the transmitter is an output of the pseudo-random sequence generator;
a communication channel in signal communication with the transmitter, the transmitter for transmitting the pseudo-random bit sequence over the communication channel; and
a pseudo-random bit sequence error detector, in signal communication with the communications channel, for detecting and correcting any error in an actual next bit of the pseudo-random bit sequence, wherein the pseudo-random bit sequence error detector comprises:
a predictor circuit that uses a plurality of bits of the pseudo-random bit sequence to provide a predicted next bit of the pseudo-random bit sequence;
a comparator circuit that compares the actual next bit in the pseudo-random bit sequence with the predicted next bit to determine whether there is an error in the actual next bit; and
a correction circuit that corrects any error in the actual next bit to provide a corrected actual next bit; and
a trigger circuit that, in response to an error in the actual next bit indicating presence of an erroneous bit in the predictor circuit, disables the correction circuit until the predictor circuit no longer contains erroneous bits.

* * * * *